United States Patent [19]

Nickerson

[11] 4,327,706
[45] May 4, 1982

[54] SOLAR POND APPARATUS

[76] Inventor: Jack A. Nickerson, 48 Hillcrest Rd., East Weymouth, Mass. 02189

[21] Appl. No.: 205,667

[22] Filed: Nov. 10, 1980

[51] Int. Cl.³ .................................................. F24J 3/02
[52] U.S. Cl. ...................................... 126/422; 126/423; 126/427; 126/437
[58] Field of Search ................ 126/415, 416, 419, 421, 126/422, 423, 427, 430, 435, 436, 437

[56] References Cited

U.S. PATENT DOCUMENTS

| | | | |
|---|---|---|---|
| 1,583,255 | 5/1926 | Moore | 126/423 |
| 2,167,576 | 7/1939 | Kiser | 126/423 |
| 4,048,981 | 9/1977 | Hobbs | 126/423 |
| 4,052,000 | 10/1977 | Honikman | 126/427 |
| 4,119,086 | 10/1978 | Brussels | 126/423 |
| 4,256,089 | 3/1981 | Lewis | 126/422 |
| 4,257,395 | 3/1981 | Wieder | 126/437 |
| 4,261,332 | 4/1981 | Stewart | 126/422 |
| 4,270,517 | 6/1981 | Stephens | 126/422 |
| 4,282,857 | 8/1981 | Pei | 126/422 |
| 4,285,333 | 8/1981 | Tanaka et al. | 126/422 |

*Primary Examiner*—Daniel J. O'Connor
*Attorney, Agent, or Firm*—Joseph H. Killion

[57] ABSTRACT

An improved Solar Pond Apparatus is described which comprises a solar pond means having a substantially flat, extended surface with upwardly directed sides thereof to retain the liquid while the liquid is exposed to the sun absorbing solar radiation and a flooding valve means connected to the solar pond means and moveable between an open position and a closed position to provide the liquid from the source and flood the liquid upon the substantially flat, extended surface of the solar pond means. Means are provided to control the depth of the solar absorbtive liquid and flooding valve control means are connected to the flooding valve means and to the means to control the depth of the solar absorbtive liquid which activates the flooding valve means to the open position when the means to control the depth of the solar absorbtive liquid determines the liquid in the solar pond means and which activates the flooding valve means to the closed position when the means to control the depth of the solar absorbtive liquid determines the second level of liquid in the solar pond means. First liquid conduit means are connected to the source of the flooding valve means and drainage valve means are connected to the solar pond means and are moveable between an open position and a closed position to drain the liquid from the solar pond means. A first sensor means is attached to the solar pond means and arranged to sense a predetermined temperature and drainage valve control means are connected to the drainage valve and to the first sensor means which actives the drainage valve means to the open position when the first sensor means senses the predetermined temperature. Storage means are connected on one end to the drainage valve means to receive the liquid at the predetermined temperature therefrom, and on the other end to an outlet means. Second liquid conduit means connect the drainage valve means to the storage means.

7 Claims, 4 Drawing Figures

SOLAR POND APPARATUS

BACKGROUND OF INVENTION

The present uncertainty and escalating price structure of fossil fuels has precipitated a plethora of inventions utilizing "natural" power sources such as solar, wind and geo-thermal energies.

These "natural" energy sources are further demanded by environmentalists to preserve and protect our natural resources and environment from destruction by such hazardous by-products of fossil fuel usage as "acid rain", water pollution, oil spills, and devastated strip-mined landscapes.

In the vehicle washing field with its enormous use of hot water and detergents, such utilization of "natural" energy sources is in its infancy, despite the vast energy and environmental conservation potential.

Today's world requires of the vehicle washing field more efficient use of "natural" energies together with an ecologically sound program for the usage of rainwater and snow, and for the recycling of waste water, in short, a total vehicle washing goal of "natural" energy sources and ecological commitment.

The prior art is fragmented and not satisfactory for the above reasons.

For example, U.S. Pat. No. 4,169,400 discloses a typical "solar plate" converter system for heating water or other liquid and providing for drainage when temperature overload conditions occur. However, the device is expensive, inefficient, cumbersome to use, and not dependable for commercial usage.

U.S. Pat. No. 4,174,703 discloses a solar heat roofing system which utilizes a translucent roof together with a heat transfer fluid manifold system for generating usable heat. Drawbacks of this system are that it is unproven, extremely costly to manufacture and install, and too fragile for industrial usage.

In general, the present inventions and devices are primarily intended for residential utilization. They generally utilize the "solar plate" converter principle either fixed or parabolic plate, and are unreliable, too delicate or costly for commercial use.

There appears to be a need for sophisticated, economical, easily constructed, industrial inventions and devices which overcome the disadvantages of these prior devices.

SUMMARY OF INVENTION

My invention relates to an improved apparatus and system for providing heated liquid utilizing "solar ponding", particularly a "batch process" approach to heating solar absorbtive liquids.

I have discovered an improved apparatus for heating liquids provided from a source which are solar absorbtive and which comprises a solar pond means having a substantially flat extended surface with upwardly directed sides thereof to retain said liquid when said liquid is exposed to the sun, absorbing solar radiation, and means are provided to control the depth of said solar absorbtive liquid. Flooding valve means are connected to said solar pond means and moveable between an opened position and a closed position to provide said liquid from said source and flood said liquid upon said substantially flat extended surface of said solar pond means. Flooding valve control means are connected to said flooding valve means and to said means to control the depth of said solar absorbtive liquid which activate said flooding valve means to said open position when said means to control the depth of said solar absorbtive liquid determines a first level of said liquid in said solar pond means and which activate said flooding valve means to said closed position when said means to control the depth of said solar absorbtive liquid determines said second level of said liquid in said solar pond means.

First liquid conduit means are connected from said source to said flooding valve means. Drainage valve means are connected to said solar pond means moveable between an open position and a closed position to drain said liquid from said solar pond means. First sensor means are attached to said solar pond means and are arranged to sense a pre-determined temperature. Drainage valve control means are connected to said drainage valve and to said first sensor means which activate said drainage valve means to said open position when said first sensor means senses said pre-determined temperature. Storage means are connected on one end to said drainage valve means to receive said liquid at said pre-determined temperature therefrom and on the other end to an outlet means, second liquid conduit means connect the drainage valve means to said storage means.

I have discovered an improved method providing heated solar absorbtive liquid utilizing solar ponding which method comprises flooding a solar absorbtive liquid on a flat extended surface which has upwardly directed sides thereof, then absorbing solar radiation into said solar absorbtive liquid. The next step is draining the solar absorbtive liquid into a storage tank, followed by pumping said solar absorbtive liquid through a heating system and circulating said solar absorbtive liquid between said storage tank and a heater, and finally, pumping said solar absorbtive liquid into said outlet.

I prefer that the solar pond means be a larger substantially flat surface which offers a large surface area for solar absorbtion, more particularly, a substantially flat member.

I prefer that the solar absorbtion liquid be an inexpensive, slow-evaporating liquid, such as water.

I prefer also that my circulator means, particularly a pump means and more particularly a swimming pool type pump, be utilized to circulate said solar absorbtive liquid between the storage means and the heater means so that even on a day on which solar radiation is inadequate the system is operative by reason of the circulator means. It is possible and practical that the same circulator means be used to pump water from the source to the solar pond means.

Accordingly, it is an advantage of my invention that the system is operative even when sufficient solar radiation is unavailable.

Also, it is an advantage of my invention that the solar absorbtive liquid can be stored in my solar pond means until required, a necessary characteristic for commercial utilization wherein large surges in demand must be economically provided for.

Other advantages of my invention are that it is strong and durable, readily manufactured and installed, and efficient and economical in use.

Another advantage of my invention is that in cold climates when snow accumulates on the solar pond means, the internal circulator and heating of water may take place, followed by the pumping of the heated water into the solar pond means, melting the snow and starting the solar absorbtive cycle.

My invention is further described in the preferred embodiment. Obviously many modifications and variations of the present invention may be made with regard to the foregoing detailed description without departing from the spirit of the invention.

DETAILED DESCRIPTION OF THE DRAWINGS

Figure 1:
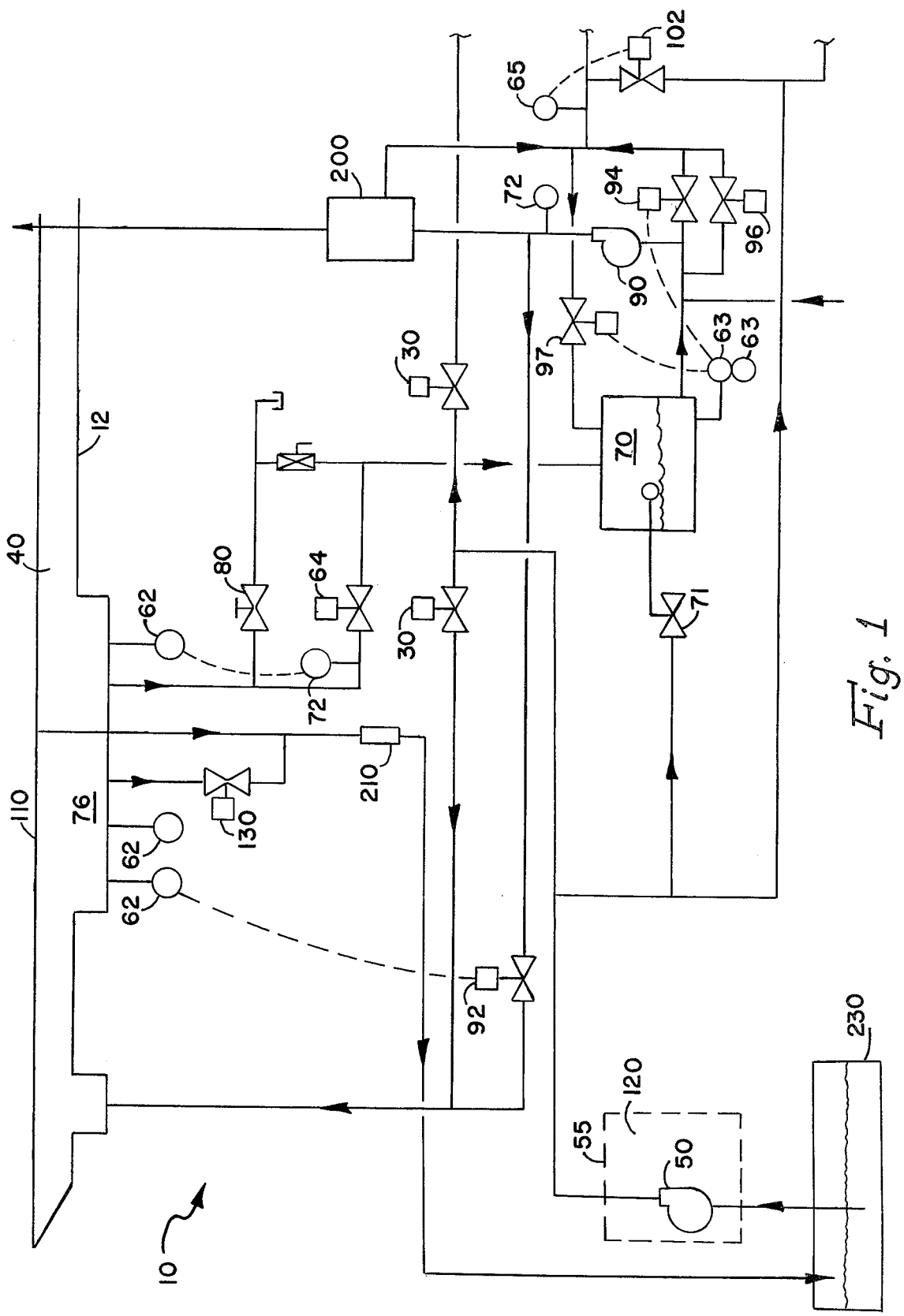
FIG. 1 is a schematic view of my solar absorbtion pond apparatus.
Figure 2:
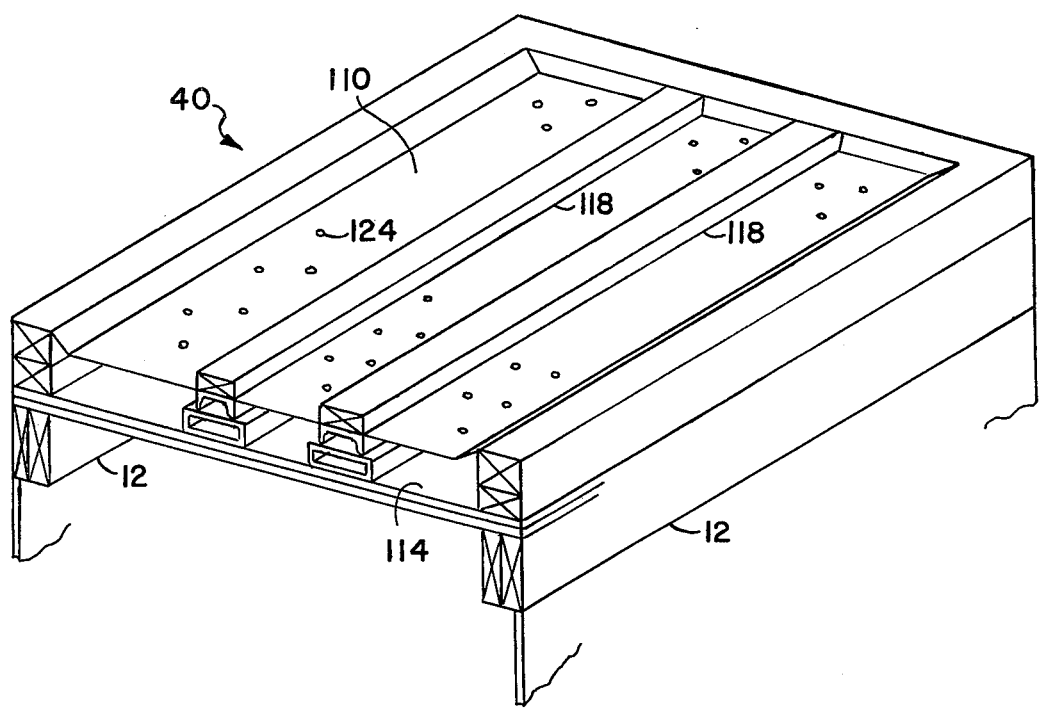
FIG. 2 is a sectional perspective planar top view of the solar absorbtion pond means of my solar absorbtion pond apparatus.

Referring now in particular to the drawings, my solar ponding apparatus is generally indicated in FIG. 1 at 10, and includes timer 20 (not shown), which opens flood valve 30, and said solar pond 40, located on roof 12 (FIG. 2), starts to be filled with water from source tank 120. The depth of water on the solar pond is governed by said timer 20, which has been previously calibrated to provide the proper amount of water. Two or three timers may be utilized in order to flood the solar pond 40, with a small amount of water for quick heating, for example, one half inch of water, then later in the day a second batch, for example, one inch of water, is pumped to the solar pond 40, by pump 50. Source water may be city water, reclaimed water passed through reclimator 55, or accumulated rainwater. When the water in said solar pond 40, has reached a predetermined temperature, for example 120°, temperature sensor/indicator 62, activates drain valve 64, and water passes into an insulated fiberglass storage tank 70. Pressure switch 72, senses that water is in the solar pond 40. Then temperature sensor/indicator 62, located in the solar pond sump area 76, makes contact, which opens said drain valve 64, which remains open until the pressure switch 72, is not satisfied or the water temperature drops below the predetermined temperature, for example 120° F. A small needle valve 80, is located above said insulated fiberglass storage tank and continually drains water from solar pond sump area 76, in order for temperature sensor/indicator 62, to indicate actual temperature of the solar pond water.

If the solar pond water reaches 130° F. for example, temperature sensor/indicator 62A, shall make contact and start through relays. Recirculation pump 90, open valve 92, and valves 94 and 96 (which are normally open for the gravity flow of the water from the insulated fiberglass storage tank 70) are closed and the system becomes pressurized. By opening valve 92, the cooler water at the bottom of said insulated fiberglass storage tank 70, is pumped by recirculation pump 90, to the solar pond 40, allowing the hotter water to flow into the topy of the insulated fiberglass storage tank 70. This recirculation shall continue until either the night dump is activated, or the temperature of the water on the solar pond drops below the predetermined temperature, for example 130° F., or pressure switch 72, indicates no more water in the solar pond.

If there has been no hot water generated, or if it has been used up by the washing of cars, fill flow valve 71, in insulated fiberglass storage tank 70, located at a predetermined level (for example 200 gallons) opens and allows cold water (either city water or reclaimed water) into the insulated fiberglass storage tank 70. Temperature sensor/indicator 63, makes contact below the predetermined temperature, for example 120° F., and starts through relays the circulation pump 90, open valve 97, and through gas heater 200, and closed valves 94 and 94. When the water reaches the predetermined temperature, for example 120° F., recirculation pump 90 stops and the valves are deactivated.

When the water in the insulated fiberglass storage tank 70, is above the predetermined temperature, for example 120° F., thermastatic blending valve 102, opens and brings the water back to the predetermined temperature, for example 120° F., before entering the outlet to the car-wash pumps.

Tank 120 is filled from the underground storage tank 230, or city water during slack hours.

Figure 2A:
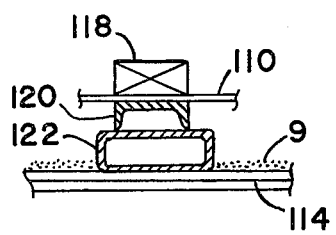
FIG. 2A is a partially fragmented cut-away side view of my solar absorbtion pond means.
Figure 2B:
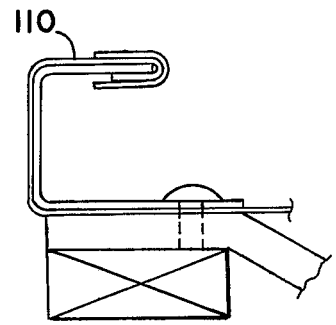
FIG. 2B is a partially fragmented view of the return means for the solar sheet.

The solar sheet is stretched across roof 12, and held in position by a channel wrap around method including two continuous hold down planks 118 (FIG. 2A) and under the hold down planks is a supporting aluminum channel 120, and channel bracket 122. The flexible solar sheet has holes 124, located to allow rainwater to drain thru and eliminate any water collecting above the solar sheet. Equipment sumps are recessed into roof to provide positive drainage. Roof drains are standard detail with the exceptions of a 2¼" ring around the drain to hold back ponding water.

When the sun goes down the temperature of the remaining heated water on the solar pond starts to cool, valve 130 is opened by means of a photo-electric switch (not shown). The water then drains back through underground storage tank 120. This valve remains open until sunrise. If it rains, some of the rainwater shall drain back to tank 120, which helps to fill it. In fact if there is any overflow it drains back into the source tank.

Typically in use the system is on a timer which activates a flood valve which fills the roof to a level determined either by a timer or a level sensor. The water then absorbs solar radiation and when it reaches a certain temperature, a portion of the water is dumped through a drain valve into the storage tanks. This water, at a certain temperature, is then cycled through a heater to further heat it for use to an outlet where it is blended to the temperature desired for the car wash. If it is a cloudy day, then the temperature sensor does not indicate that the water on the solar pond means has reached a certain temperature. The circulator is activated and the water in the storage tank is pumped through the heating means until the desired temperature for blending is produced.

What is claimed is:

1. A solar pond apparatus for heating liquids which are solar absorbtive and provided from a source comprising:
   (a) solar pond means having a substantially flat, extended surface with upwardly directed sides thereof to retain said liquid while said liquid is exposed to the sun absorbing solar radiation;
   (b) flooding valve means connected to said solar pond means and moveable between an open position and a closed position to provide said liquid from said source and flood said liquid upon said substantially flat, extended surface of said solar pond means;
   (c) means to control the depth of said solar absorbtive liquid;

(d) flooding valve control means connected to said flooding valve means and to said means to control the depth of said solar absorbtive liquid, which activates said flooding valve means to said open position when said means to control the depth of said solar absorbtive liquid determines said first level of said liquid in said solar pond means and which activates said flooding valve means to said closed position when said means to control the depth of said solar absorbtive liquid determines said second level of liquid in said solar pond means;

(e) first liquid conduit means connect said source to said flooding valve means;

(f) drainage valve means connected to said solar pond means moveable between an open position and a closed position to drain said liquid from said solar pond means;

(g) first sensor means attached to said solar pond means and arranged to sense a predetermined temperature;

(h) drainage valve control means connected to said drainage valve and to said first sensor means which activates said drainage valve means to said open position when said first sensor means senses said predetermined temperature;

(i) storage means connected on one end to said drainage valve means to receive said liquid at said predetermined temperature therefrom, and on the other end to an outlet means;

(j) second liquid conduit means connecting said drainage valve means to said storage means.

2. The solar pond apparatus for heating liquids which are solar absorbtive and provided from a source as in claim 1, further comprising:
(a) heater means connected to said storage means to heat said liquid from said storage tank;
(b) third conduit means connecting said storage means and said heater means;
(c) circulator means to circulate said liquid between said storage means and said heater means activated when the temperature in said storage means drops below said predetermined temperature.

3. The solar pond apparatus for heating liquids which are solar absorbtive of claim 1 further comprising:
(a) blending valve means connected on one end thereof to said outlet and on the other end thereof to said source to blend cool liquid with said heated liquid for use;
(b) further conduit means connecting said blending valve means to said source.

4. The solar pond apparatus for heating liquids which are solar absorbtive of claim 1, wherein the means to control the depth of said liquid further comprises:
(a) needle valve means connected to said second sensor means to remove liquid from the area adjacent said sensor to provide a more accurate liquid temperature at said second sensor means.

5. The solar pond apparatus for heating liquids which are solar absorbtive of claim 1, wherein said solar pond means further comprises:
(a) a flexible member covering a substrate;
(b) retainer clamp means affixed on one side thereof to said substrate;
(c) retainer means adapting over said flexible member and cooperating into said retainer clamp means to hold said flexible member in place.

6. The solar pond apparatus for heating liquids which are solar absorbtive and provided from a source described in claim 1 and further comprising:
(a) timer means connected to said flooding valve control means to activate said flooding valve control means at a predetermined time.

7. The solar pond apparatus for heating liquids which are solar absorbtive and provided from a source as in claim 5, wherein said flexible member further defines a multiplicity of perforations therein to allow rain-water to pass through and be collected for utilization in the system.

* * * * *